United States Patent [19]

Spencer, Jr.

[11] 4,305,258

[45] Dec. 15, 1981

[54] VEHICLE AIR CONDITIONING CONTROL SYSTEM

[76] Inventor: Joseph H. Spencer, Jr., 4234 Tyndale Ave., Charlotte, N.C. 28210

[21] Appl. No.: 34,553

[22] Filed: Apr. 30, 1979

[51] Int. Cl.³ .............................................. B60H 3/04
[52] U.S. Cl. ........................................ 62/133; 62/243
[58] Field of Search ................ 123/198 R; 307/10 R; 62/133, 243, 244, 239, 323, 241

[56] References Cited

U.S. PATENT DOCUMENTS

| | | | |
|---|---|---|---|
| 3,606,764 | 9/1971 | Yokouchi et al. | 123/198 R X |
| 3,710,587 | 1/1973 | Hayashi | 62/243 X |
| 3,724,230 | 4/1973 | Muto et al. | 62/133 |
| 3,861,282 | 1/1975 | Scherenberg et al. | 62/133 X |
| 4,155,225 | 5/1979 | Upchurch, Jr. | 62/133 |
| 4,206,613 | 6/1980 | Shockley | 62/133 |

*Primary Examiner*—William E. Wayner
*Assistant Examiner*—Harry Tanner

[57] ABSTRACT

An apparatus and method for controlling an engine driven air conditioning system in an over-the-road vehicle in which deactivation of the air conditioning system is signalled upon certain occurrences and in which actuation of a vehicle brake light for a predetermined set period of time overrides any otherwise signalled deactivation.

4 Claims, 4 Drawing Figures

FUNCTIONAL BLOCK DIAGRAM

FUNCTIONAL BLOCK DIAGRAM

VEHICLE AIR CONDITIONING CONTROL SYSTEM

BACKGROUND OF THE INVENTION

The present invention relates to a method and apparatus for the control of air conditioning systems used to cool the passenger compartments of over-the-road vehicles, such as trucks and automobiles. The invention is concerned with air conditioning systems including a cooling-medium compressor which is driven by the vehicle engine, such that during periods of maximum power requirements for the engine (e.g., acceleration) the air conditioning system is automatically turned off (i.e., taken off line), but during periods of normal or less than normal power requirements (i.e., cruising, idling and deceleration) the air conditioning system is operating to control the vehicle passenger compartment within the desired comfort range of temperature.

Previous methods for using and controlling an automotive air conditioning system include the following systems:

(1) The air conditioner is left on at all times and passenger compartment temperature is controlled by manual adjustment of the reheat system;

(2) The air conditioner is left on at all times and the passenger compartment temperature is controlled by thermostatic control of the reheat system;

(3) A passenger compartment thermostat control is provided for the air conditioner compressor on/off control as a function of passenger compartment or conditioned air temperature.

There are a number of disadvantages inherent in these prior art methods, among which are: decreased fuel economy with the air conditioning system left on; decreased power, acceleration and safety with the air conditioning system on (This is especially important for cars with small engines that need all available engine power for maximum acceleration situations, such as passing, pulling into traffic, and hill climbing where more power is needed); and inefficient temperature control by blending hot air (reheat) manually or automatically (inefficient temperature control) by switching the compressor of the air conditioning system on and off by means consisting solely of a thermostatic control.

Many automobiles are equipped with an air-conditioning system. The compressor of the air conditioner imposes a relatively constant drag on the engine and the installation of the air conditioner has, in past years, often been limited, as a practical matter, to automobiles having a relatively high power output engine and large displacement, to assure maximum power in situations where quick acceleration is needed for safety considerations. Even with the newer, smaller and more efficient air conditioning systems used with smaller engines, fuel economy and safety are limited when the air conditioning system is on, as well as power being limited during periods of maximum power requirements for the engine (acceleration situations).

SUMMARY OF THE INVENTION

It is an object of the present invention to provide a method of controlling the cooling power requirement, as well as to provide an apparatus for performing the cooling function such that the cooling power requirement of the air conditioning system is automatically adjusted in response to changes in the operating condition (i.e. idle, cruise, acceleration, hill climbing, deceleration of the vehicle engine and changes in the apparent inertia of the vehicle.

It is a further object of the invention to overcome the practical limitation, based upon vehicle engine power, in installing air conditioning systems by providing vehicle air conditioning systems which operate more efficiently (as a function of fuel consumption) and more safely (as a function of engine power requirements) by incorporation of a control system that will vary the automobile's air conditioning process as a function of the changing external power requirements of its power source. The present invention utilizes a control system which provides for more efficient and safer utilization of vehicle air conditioning systems.

The control system will control the vehicle's air conditioning system as a most efficient and safer function of the changing external power requirements (i.e., acceleration, hill climbing, deceleration, cruise and idle) of its power source (the vehicle engine) as compared to the cooling-conditioning load requirements occurring during various periods of operation (i.e, acceleration, hill climbing, deceleration, cruise or idle). This can be accomplished according to a preferred embodiment of the present invention by a method comprising the following sequence of process steps controlled by the control system:

(1) during acceleration and cruising, the air conditioning system is automatically controlled by thermostat and left off if the passenger compartment temperature is within the desired comfort limits;

(2) during cruising, the air conditioning system is automatically activated by thermostat if the passenger compartment temperature is higher than the desired comfort limits;

(3) during deceleration and idle, the air conditioning system is automatically activated by the mercury switch (after a short delay, e.g., about 2 to 5seconds), when the passenger compartment temperature is higher than the desired comfort limits or within the high side limits of the comfort range;

(4) during deceleration and idle, the air conditioning system is automatically turned off by thermostat if the passenger compartment is lower than the desired comfort limits:

(5) in one preferred embodiment, the control system utilizes the following monofunctional logic control that affords added safety at critical periods: during hard acceleration and/or increased power requirement periods (such as passing, pulling out into traffic, high climbing, etc.) the high acceleration and/or increased power requirement are sensed by an accelerometer, which senses changes in apparent inertia, and the air conditioning system is automatically turned off line and stays off regardless of the passenger compartment temperature to allow additional drive line power needed from the vehicle engine.

(6) in a second preferred embodiment the control system utilizes a multifunctional logic, one or more devices sense acceleration/cruise/deceleration/idle/orientation and interpret this acceleration/cruise/deceleration/idle/orientation to control the air conditioning system in the appropriate manner, as previously mentioned. The device is preferably an accelerometer, which senses changes in inertia, speed and/or orientation of the vehicle and most preferably is a mercury switch.

(7) if the vehicle brake remains activated for a specified of commands from the accelerometer, because the vehicle will most likely be at rest or decelerating and its orientation (level) might cause erroneous commands from the accelerometer, and because the engine idle mode will be imminent.

As used herein, changes in "apparent inertia" are defined as changes in "acceleration or deceleration and/or changes in the orientation" (i.e. level, such as in hill climbing) which are sensed by the accelerometer of the present invention.

In response to the control system and process of the present invention, the operation of the air conditioning system may be varied more efficiently and safely, as a function of the apparent inertia of the vehicle, utilizing the following additional systems and methods:

(1) the work of cooling may be varied by a variable speed drive on the compressor;

(2) the work of cooling may be varied by varying the amount of slip in any type of compressor clutch;

(3) the cooling work may be varied by proportional means of unloading and loading the compressor, or on/off valving of the refrigerant lines;

(4) the cooling work may be varied by any other known means of loading or unloading the compressor;

(5) the cooling work may be varied by use of a reservoir for release of compressed refrigerant (cooling effect) that is independent of the power source operating characteristics;

(6) the cooling work may be varied in the air conditioning system by varying the amount of air available for compression, by varying the compression ratio, or by varying the speed of the compressor.

(7) the cooling work may be varied in the conventional air conditioning system by varying the amount of refrigerant available for compression by varying the compression ratio or by varying the speed of the compressor.

Among the advantages of the method and apparatus of the present invention are:

(1) reduced fuel consumption with the air conditioning system on because most of the energy required for the work of cooling is provided from the vehicle's kinetic energy during periods of lower power requirements, e.g., deceleration and cruise, rather than solely from chemical energy (fuel) consumption;

(2) improved operation and safety for vehicles with relatively low power output engines (i.e., compact and sub-compact automobiles) because more available engine power is provided to the drive train during periods of acceleration or hill climbing because the compressor is off line and not utilizing power. This advantage would be primarily important to vehicles with small engines, that in many cases do not provide sufficient power for good acceleration (hence safe operation in passing, high climbing or pulling out into traffic) when the air conditioning system is on. Many drivers of vehicles with small engines are habitually distracted when they turn off their air conditioning systems when added power is required for passing or pulling into traffic; hill climbing, etc.;

(3) improved passenger compartment temperature control because the passenger compartment temperature sensor would provide space comfort more efficiently (as a function of fuel consumption) by controlling compartment temperature with on/off operation of the compressor rather than allowing the compressor to run continuously and relying on a constant reheat of cooled air as is used in most conventional vehicle air conditioning systems.

The basic assumption for the operation of the control system of the present invention, based upon sensing changes in apparent inertia of the vehicle to change operation of the air conditioning system, is that power is readily available to drive the air conditioning system compressor during periods of deceleration, cruise and idle. When the accelerometer senses a change in apparent inertia, a signal is sent to a timing mechanism (e.g., a time delay switch). If the change in apparent inertia (e.g. deceleration or idle) is maintained for a set period of time (e.g., 2 to 5 seconds) the timing mechanism relays a signal that starts the air conditioning system. If the change in apparent inertia (e.g. hill climbing or acceleration) is maintained for a set period of time (e.g, 0.3 to 0.5 seconds), the timing mechanism relays a signal that deactivates the air conditioning system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
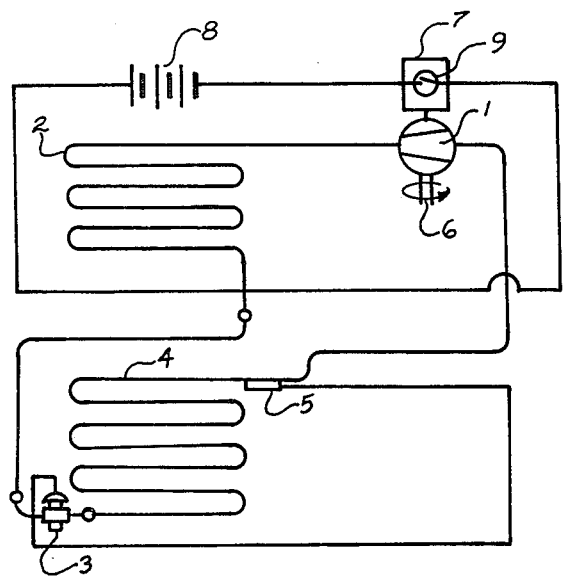
FIG. 1 is a schematic diagram of a cooling system built into an automotive vehicle for cooling the passenger compartment of the vehicle.

The air conditioning system set forth in FIG. 1 illustrates a closed circuit system for the circulation of a cooling medium. The closed circuit system contains a cooling-medium compressor 1 the outlet side of which delivers cooling medium to a condenser 2. The outlet side of the condenser 2 is connected, by means of an expansion valve 3, to an evaporator 4. At the outlet end of evaporator 4 is a temperature sensor 5 which controls the operation of the expansion valve 3.

The cooling-medium compressor 1 is driven by a drive shaft 6, which in turn is driven by the motor or engine (not illustrated) of the vehicle. The activation and deactivation of the cooling medium compressor 1 is controlled by means of a control system 7. The control system 7 is energized from the electrical energy supply system of the vehicle, e.g., the vehicle battery 8, and may be controlled by an accelerometer (e.g., a mercury switch) 9 connected in the current path of the control system 7. The control system 7 senses changes in apparent inertia (acceleration/deceleration/orientation) by means of the accelerometer 9, which also serves to turn on and off the compressor 1.

Figure 2:
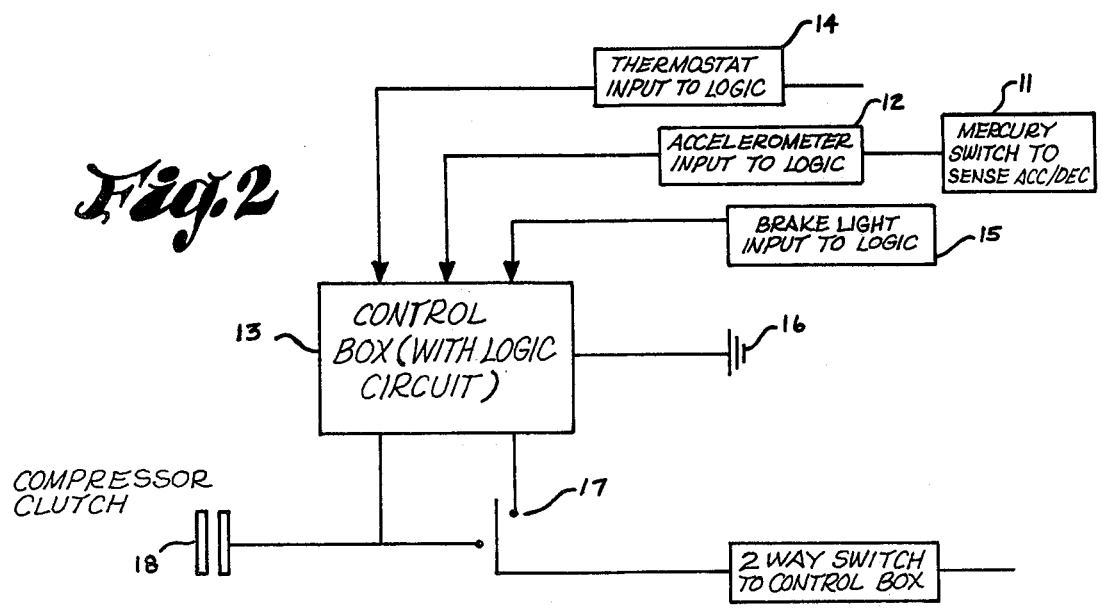
FIG. 2 is a functional block diagram of the control system of the present invention connected to an air conditioning compression clutch.

The functional block diagram set forth in FIG. 2 illustrates the logic inputs to the control box with the logic circuit 13 which controls the air conditioner compressor clutch 18. The accelerometer (mercury switch) 11 senses a change in apparent inertia (e.g., orientation, acceleration or deceleration) to provide accelerometer input to logic 12 to the control box (with the logic circuit) 13. A thermostat (not shown) senses the temperature in the vehicle compartment (not shown) to provide thermostat input to logic 14 to the control box 13. Brake light input to logic 15 senses whether the brake light (not shown) is on or off and provides this information to the control box 13. The electrical energy for the control system is provided by the battery (not shown). The logic circuit of the control box 13 has a ground 16. The two-way switch 17 activates either the compression clutch 18 directly or control box 13 which turns the compressor clutch 18 on and off automatically.

Figure 3:
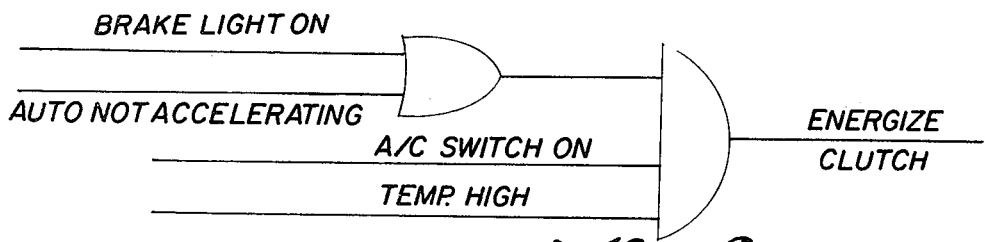
FIG. 3 is a logic diagram illustrating the inputs to the logic circuit utilized to energize or activate the air conditioning compressor clutch.

The logic diagram set forth in FIG. 3 explains the manner in which the control system of FIG. 2 operates. When the vehicle is not accelerating and the air conditioning system switch is on, the air conditioning compressor clutch is activated. Optionally and preferably, the air conditioning compressor clutch is activated when the brake light is on for a specified period and the vehicle compartment temperature is higher than desired and deactivated when the brake light is off, the temperature is lower than desired or the vehicle is accelerating.

Figure 4:
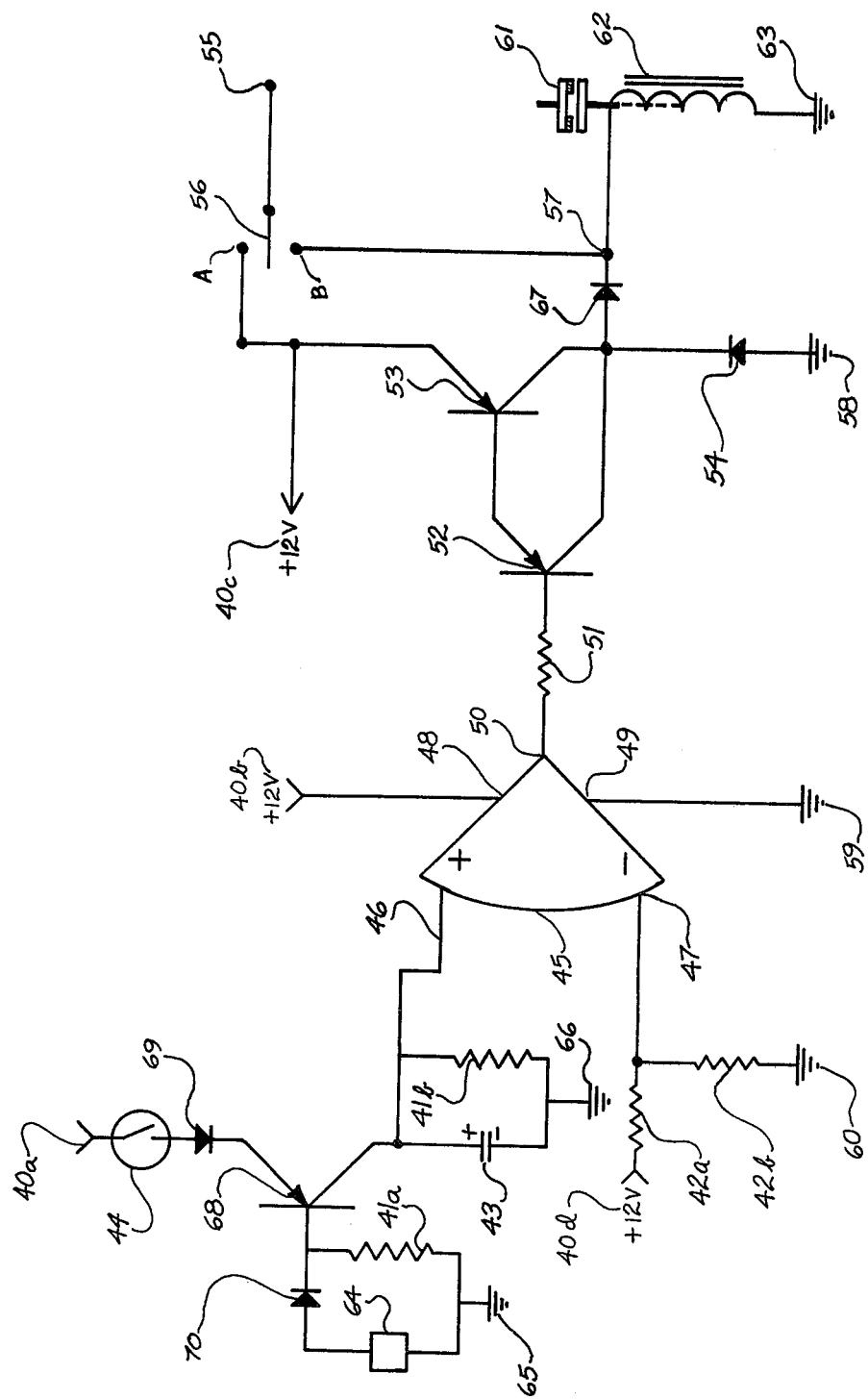
FIG. 4 is a circuit diagram of the subject control system utilizing a monofunctional logic control.

FIG. 4 is a circuit diagram of one embodiment of the subject control system utilizing a monofunctional logic control. The control system may be bypassed and normal manual operation of the air conditioning accomplished by closing two-way switch 56 to position "B". Automatic control of the air conditioning is when two-way switch 56 to the air conditioner control box connection 55 is closed to position "A", activating the control system. A voltage (e.g., 12 volts for an automobile, which is what will be described in detail) is then applied from points 40(c) to points 40(a), 40(b) and 40(d). The voltage from connections 40(a) and 40(d) is applied to mercury switch 44 and to resistor 42(a) respectively (e.g. 10 Kohm). The voltage from connection 40(b) is connected at 48 to the positive side of comparator 45. The net voltage applied is divided substantially equally between resistors 42(a) (e.g. 10 Kohm) and 42(b) (e.g. 10 Kohm) connected to ground 60, therefore applying about 6 volts through point 47. Point 49 is grounded at 59. At this time, mercury switch 44 is opened, the voltage on electrolytic capacitor 43 (50 μf, 25 vdc) which is grounded at 66, is substantially zero. Therefore the voltage being applied to the positive input 46 is the comparator 45 is about zero. The comparator 45 works so that when the voltage on the negative input 47 is greater than the voltage on the positive input 46, then the output of the comparator 45 at connection 50 goes to about zero volts. Conversely, if the voltage at the positive input 46 of the comparator 45 is greater than the voltage at the negative input 47 of the comparator 45, then the output voltage of the comparator at 50 goes to about 12 volts.

Under the conditions just stated, the voltage at 50 on the output of the comparator 45 would be about zero. This would permit current to flow from 55 through transistors 52 and 53, through resistor 51 (e.g. 2.7 Kohm) to connection 50, which is approximately ground. This turns on transistors 52 and 53. Current then flows through transistors 52 and 53 through diode 67 (e.g. A14F diode, 50 vdc) through connection 57 to the electromagnetic core 62 grounded at 63 and controlling air conditioner clutch 61. This then activates the automobile air conditioning unit.

The automobile air conditioning unit will continue to operate until the automobile is accelerated (e.g. in order to pass another vehicle or to pull into traffic and during substantial hill climbing) then mercury switch 44 closes. This applies voltage through diode 69 to transistor 68. If the brake 64 is off, current will flow through the transistor 68 and resistor 41(a) to ground, thus turning on the transistor 68. This permits capacitor 43 to charge up to about 12 volts. The voltage then on the positive input 46 of the comparator 45 is larger than the voltage on the negative input 47 to the comparator 45. The output of the comparator 45 then rises to about 12 volts at 50. Since the voltage at 50 is substantially equal to the voltage at 55, no current is permitted to flow through transistors 52 and 53. These two transistors are then turned off. The current then flowing to connection 56 and to the electromagnetic core 62 is substantially zero. The clutch 61 then deactivates and the automobile air conditioning unit is turned off.

The automobile air conditioning unit will continue to stay off until mercury switch 44 is open. This will occur when the automobile has again reached relatively level ground and substantially constant or decreasing velocity. When this occurs, the transistor 68 is turned off and the voltage on the capacitor 43 will then discharge through resistor 41(b) (e.g. 75 Kohm). After a short time (e.g. 3 seconds), the voltage on the capacitor 43 has discharged to a voltage of less than 6 volts. Therefore, the voltage on the positive input 46 on the comparator 45 will be less than the voltage at the negative input 47 to the comparator 45. When this occurs, the output of the comparator 45 at 50 drops to substantially zero. Transistors 52 and 53 are then turned on, current is allowed to pass through connection 57 to the electromagnetic clutch core 62, again activating the automobile air conditioning clutch 61.

When the brake 64 is applied, voltage is applied through diode 70 to resistor 41(a) and the base of transistor 68. This turns off transistor 68, permitting capacitor 43 to discharge after a period of time. As long as the brake 64 is on, capacitor 43 is not allowed to charge up and the air conditioner will remain on.

It is within the scope of this invention that the time it takes for the capacitor 43 to charge and discharge can be adjusted by either changing the resistance of resistor 41(a), 41(b), or changing the capacitor 43. It is possible to utilize variable resistors 41(a) and 41(b) to change the time periods for the charge and discharge of the capacitor 43. Power may be applied directly to the magnetic clutch core 62 without going through the control system. This can be done by appropriately closing switch 56 to position "B" with, e.g. the switch inside the automobile or a switch on the control box.

The present invention comprises an automatic control system for activating and deactivating the air conditioning system of a vehicle, which includes: means for sensing changes in the apparent inertia of the vehicle; timing means for sensing when a change in apparent inertia is maintained for a predetermined period of time; signal means for transmitting an electrical signal when the change in apparent inertia is maintained for the predetermined period of time; and means, responsive to the signal means, for activating and deactivating the air conditioning system. The means for sensing changes in the apparent inertia of the vehicle is preferably an accelerometer and more preferably, a mercury switch. The automatic control system may additionally include: (1) a thermostatic override whereby the air conditioning system is activated only when a temperature sensing means senses that the temperature in the vehicle is higher than a predetermined set level and/or (2) a brake override whereby the air conditioning system is activated when the brake light is on for a predetermined set period of time. The thermostatic override will override the brake override and either or both of them will override the primary automatic control system which is activated or deactivated by sensed changes in apparent inertia.

The present invention also comprises a process for activating and deactivating the air conditioning system of a vehicle, which includes: sensing changes in the apparent inertia of the vehicle; sensing when a change in apparent inertia is maintained for a predetermined period of time; transmitting an electrical signal when the change in apparent inertia is maintained for the predetermined period of time; responsive to the electrical signal, activating and deactivating the air conditioning system. The process may additionally include: (1) thermostatically overriding the primary process by activating the air conditioning system only when the temperature in the vehicle is higher than a predetermined set level and/or (2) overriding the primary process by activating the air conditioning system when the brake light is on for a predetermined set period of time. The thermostatic override process will override the brake override process and either or both process will override the primary process which is activated or deactivated by sensed changes in apparent inertia.

What I claim is:

1. An automatic control system for activating and deactivating the air conditioning system of a vehicle, which consists essentially of: means for sensing changes in the apparent inertia of said vehicle; timing means for sensing when a change in said apparent inertia is maintained for a predetermined period of time; signal means for transmitting an electrical signal when said change in said apparent inertia is maintained for said predetermined period of time; means, responsive to said signal means, for activating and deactivating said air conditioning system; and brake override means for activating said air conditioning system when the brake light is on for a predetermined set period of time.

2. A process for activating and deactivating the air conditioning system of a vehicle, which consists essentially of sensing changes in the apparent inertia of said vehicle; sensing when a change in said apparent inertia is maintained for a predetermined period of time; transmitting an electrical signal when said change in apparent inertia is maintained for said predetermined period of time; activating and deactivating said air conditioning system in response to said transmitting of an electrical signal; and activating said air conditioning system when the brake light is on for a predetermined set period of time.

3. In an over-the-road vehicle having a vehicle engine, an air conditioning system driven by the vehicle engine, and vehicle brakes including a brake warning light, an automatic control system for activating and deactivating the air conditioning system and which comprises means operatively connected with the air conditioning system for controllably activating and deactivating the air conditioning system, signal means operatively connected with said first named means for transmitting thereto an electrical signal for deactivating the air conditioning system, and brake override means operatively connected with the brake warning light and with said first named means for activating the air conditioning system when the brake light is on for a predetermined set period of time.

4. A method of controlling an air conditioning system driven by the engine of an over-the-road vehicle which has vehicle brakes including a brake warning light, the method comprising the steps of signalling the occurrence of an occasion for deactivating the air conditioning system, controllably activating and deactivating the air conditioning system in response to signalled occurrences, and overriding any signalled deactivation and activating the air conditioning system in response to the brake light being on for a predetermined set period of time.

* * * * *